(12) United States Patent
Chen et al.

(10) Patent No.: US 10,282,576 B2
(45) Date of Patent: May 7, 2019

(54) BOOK PLACING ATTITUDE RECOGNITION METHOD BASED ON RSSI SIGNAL VALUE OF RFID

(71) Applicant: NANJING UNIVERSITY, Nanjing (CN)

(72) Inventors: Lijun Chen, Nanjing (CN); Yuanjie Luo, Nanjing (CN); Jia Liu, Nanjing (CN); Linghao Wan, Nanjing (CN); Xi Chen, Nanjing (CN); Afan Zeng, Nanjing (CN); Ying Li, Nanjing (CN); Qingpu Shi, Nanjing (CN); Jiaqi Huang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/739,014

(22) PCT Filed: Jan. 11, 2017

(86) PCT No.: PCT/CN2017/070930
§ 371 (c)(1),
(2) Date: Dec. 21, 2017

(87) PCT Pub. No.: WO2017/193624
PCT Pub. Date: Nov. 16, 2017

(65) Prior Publication Data
US 2018/0189529 A1 Jul. 5, 2018

(30) Foreign Application Priority Data
May 13, 2016 (CN) .......................... 2016 1 0318946

(51) Int. Cl.
*G06F 19/00* (2018.01)
*G06K 7/10* (2006.01)
(Continued)

(52) U.S. Cl.
CPC ..... *G06K 7/10366* (2013.01); *G06K 7/10376* (2013.01); *G06N 20/00* (2019.01); *G06Q 10/00* (2013.01)

(58) Field of Classification Search
CPC ........... G06K 17/0022; G06K 17/0025; G06Q 10/087; G06Q 10/0875
(Continued)

(56) References Cited

U.S. PATENT DOCUMENTS 6,655,586 B1 * 12/2003 Back .................... G06K 7/0008
235/375
7,621,448 B2 * 11/2009 Sakurai .................. G06Q 10/10
235/385
(Continued)

*Primary Examiner* — Daniel St Cyr
(74) *Attorney, Agent, or Firm* — CPM Patent Consulting, LLC

(57) ABSTRACT

A book placement posture identification method based on an RSSI signal value of RFID, including: step 1, horizontally moving to read the signal of an RFID tag placed in a book by using an RFID device; step 2, classifying triples with the same EPC number as a category to serve as the RSSI signal values of the internal RFID tag of the book obtained at different moments; step 3, preprocessing the data obtained in step 2; step 4, establishing a model to obtain a time-varying rule of the RSSI value of the RFID tag of the book; step 5, sampling data, training a classification model, and judging the placement posture of the book according to a model established according to test data and a classification model; and step 6, vertically moving to read the signal of the RFID tag placed in the book by using the RFID device.

6 Claims, 4 Drawing Sheets

(51) Int. Cl.
*G06N 20/00* (2019.01)
*G06Q 10/00* (2012.01)

(58) Field of Classification Search
USPC .......................... 235/385, 380, 383, 472.02
See application file for complete search history.

(56) References Cited

U.S. PATENT DOCUMENTS

2016/0189170 A1* 6/2016 Nadler ................... G06Q 30/02
  705/26.1
2016/0189174 A1* 6/2016 Heath ................ G06Q 30/0201
  705/7.29

* cited by examiner ial phase of International Application No. PCT/CN2017/070930 filed on 11 Jan. 2017 which designated the U.S. and claims priority to Chinese Application No. CN 201610318946.1 filed on 13 May 2016, the entire contents of each of which are hereby incorporated by reference.

BOOK PLACING ATTITUDE RECOGNITION METHOD BASED ON RSSI SIGNAL VALUE OF RFID

This application is the U.S. national phase of International Application No. PCT/CN2017/070930 filed on 11 Jan. 2017 which designated the U.S. and claims priority to Chinese Application No. CN 201610318946.1 filed on 13 May 2016, the entire contents of each of which are hereby incorporated by reference.

FIELD OF THE INVENTION

The present invention relates to the technical field of RFID, and in particular to a book placement posture identification method based on an RSSI signal value of RFID.

BACKGROUND OF THE INVENTION

RFID (Radio Frequency Identification, radio frequency identification) is a kind of noncontact automatic identification technology, also known as radio frequency identification, and is a kind of communication technology that can identify specific targets and read and write relevant data by radio signals without identifying mechanical or optical contact established between the system and the specific targets. The RFID technology has a broad application prospect and has been gradually applied to all aspects of industrial production and daily life, and especially in the aspect of libraries, more and more libraries begin to adopt the RFID technology to replace the original bar code systems.

The traditional library bar code system has the following disadvantages: 1. a bar code adopts the laser technology, when the information of a book needs to be scanned, the book must be manually opened, and the bar code in the book is scanned by using a scanner, thereby wasting a lot of labor; 2. the bar code can store fewer data, and the data are not encoded, so that the confidentiality and security of the data are not high; 3. the bar code can only identify the producer and the product, and cannot identify the specific product. Radio frequency identification (RFID) technology can solve these problems and mainly has the following outstanding advantages: 1. non-contact reading: an RFID tag can be read through a non-metallic material without being in direct contact with the tag, therefore the identification work is accomplished without manual intervention, and automation is realized; 2. large data storage capacity: the data storage capacity of the RFID tag is large, and the data on the tag can be encrypted, updated, read and written at any time, so that the RFID tag is especially suitable for storing a large number of data or the situation that to-be-stored data on articles change frequently; 3. high reading and writing speed: the RFID technology can identify high-speed moving objects and can identify a plurality of tags at the same time, so that the operation is quick and convenient; 4. high data security: besides password protection of the tag, security management of the data part can be realized by using some algorithms, such as DES, RSA, DSA, MD5 and the like, a reader-writer and an electronic tag can realize mutual authentication so as to achieve secure communication and storage. It can be said that the introduction of the RFID technology has brought about great convenience to the library management. At present, the RSSI signals of the RFID tags are not used in the identification of book placement postures in the libraries. In the libraries, due to the carelessness of some readers, the books are randomly placed on other books occasionally, resulting in disorder of book arrangement, which affects the management of the books in the libraries, these books horizontally placed by mistake can be automatically identified by using RFID tag signals, thereby facilitating the management of the books by librarians, ensuring neat and orderly appearance of the libraries, and also bringing convenience to the readers to find books.

SUMMARY OF THE INVENTION

Objective of the invention: the technical problem to be solved by the present invention is to provide a book placement posture identification method based on an RSSI signal value of RFID in view of the shortcomings in the prior art, in order to automatically identify books horizontally placed on bookshelves by mistake in libraries by using the RSSI value in the RFID technology.

In order to solve the above technical problems, the present invention discloses a book placement posture identification method based on an RSSI signal value of RFID, including a book placement posture identification method based on a time-varying rule of an RSSI value of an RFID tag, and the specific steps are as follows:

step 1, reading an RFID tag placed in a book by using an RFID device, wherein the RFID tag includes: an EPC number epc of the RFID tag of the book, the RSSI value rssi of the RFID tag, and a moment t of reading the RFID tag, the three pieces of information are expressed as a triple p={epc, rssi, t} for expressing the RSSI value, read at the moment t, of the RFID tag placed in the book;

step 2, classifying the triples with the same EPC number as a category to serve as the RSSI signal values of the internal RFID tag of the book obtained at different moments;

step 3, preprocessing the triples obtained in step 2 to smooth the data and eliminate impurities;

step 4, establishing a quadratic curve model of the data preprocessed in step 3 to obtain a time-varying rule of the RSSI value of the RFID tag of the book;

step 5, performing training by using the quadratic curve model established in step 4, and obtaining a classification model by using Naive Bayes, SVM and other algorithms; collecting the signal of the RFID tag of the to-be-identified book, and judging whether the placement posture of the to-be-identified book is being placed vertical to a bookshelf or placed horizontally on the bookshelf according to the classification model; and step 6, finally confirming the position of the book according to a sorting algorithm, and judging whether the judgment in step 5 is incorrect.

Step 2 includes:

classifying the triples obtained in step 1 according to the EPC numbers, and classifying the triples with the same EPC number as a category P to express the RSSI signal values of the book read at different moments.

Step 3 includes the following steps:

step 3-1, sorting the triples in each category P in step 2 according to time, wherein the triples with small triple time are in the front, and the triples with large time are behind;

step 3-2, performing smoothing processing on the data;

step 3-3, obtaining the maximum RSSI value and the corresponding time t in each category P, and marking the same as maxindex;

step 3-4, for each category P, traversing front and back triples from the maxindex, if a time difference $\Delta t$ of two adjacent triples p is greater than a threshold, eliminating the data of the triples beyond the triples so as to remove discrete data; and step 3-5, for each category P, traversing front and back triples from the maxindex: in a forward traversing process, the rssi values in the triples should be smaller and smaller, and if the triple with the rssi value starting to become large is traversed, eliminating the data of the triples in front of the triple; and in a backward traversing process, the rssi values in the triples should also be smaller and smaller, and if the triple with the rssi value starting to become large is traversed, eliminating the data of the triples behind the triple.

Step 4 includes:

performing quadratic curve fitting on the data preprocessed in step 3, and establishing the quadratic curve model to obtain the time-varying rule of the RSSI value of the RFID tag of the book, wherein the quadratic curve model is expressed in the form as follows:

$$rssi = a \times t^2 + b \times t + c$$

a, b and c respectively express coefficients of a quadratic curve. The coefficients a, b and c of the quadratic curve model are solved by using the least square method.

Step 5 includes the following steps:

step 5-1, randomly taking out a certain number of books (5-30% or so are selected in general), horizontally placing the books on other vertically placed books, reading the RFID tags of these books, preprocessing the RFID tags, and establishing the quadratic curve model;

step 5-2, training the quadratic curve model established in step 5-1 by using an SVM classification algorithm, a Naive Bayes classification algorithm and other classification algorithms to obtain the classification model; and step 5-3, after the classification algorithm is obtained, reading the RFID tag of a to-be-identified book, performing preprocessing, establishing the quadratic curve model, placing the quadratic curve model in the classification model, performing classification judgment, and identifying whether the placement posture of the book is being placed vertical to the bookshelf or placed horizontally on the bookshelf.

Step 6 includes the following steps:

step 6-1, if it is judged that the book is placed horizontally on the bookshelf in step 5-3, vertically moving to read the signal of the RFID tag placed in the book by using the RFID device; and step 6-2, finally confirming the position of the book by using an RSSI book sorting algorithm, and judging whether the result in step 5 is incorrect.

Step 6-2 includes the following steps:

step 6-2-1, classifying the triples with the same EPC number as a category, and performing data preprocessing and quadratic curve fitting;

step 6-2-2, obtaining the time T where the wave crest, namely, the highest point, of the fitted curve is located, and sorting the time T of all the RFID tags to obtain a position sequence of each book corresponding to the RFID tag; and step 6-2-3, if the time of the RFID tags are arranged in sequence, and it is judged that the time where the book placed horizontally on the bookshelf is located comes last, indicating that the judgment in step 5 is correct, and otherwise, indicating that the judgment in step 5 is incorrect, and the book is placed vertical to the bookshelf.

Beneficial effects: in the present invention, the RSSI signal of the RFID tag signal is applied to the book placement posture identification so as to accurately judge the states of the books placed on the bookshelf and detect the books lying on the other books on the bookshelf, so that the book management personnel can correct the incorrect placement postures of the books, and the books in the libraries are in a trim and orderly state.

BRIEF DESCRIPTION OF THE DRAWINGS

The present invention will be further described below with reference to the accompanying drawings and specific embodiments, and the advantages of the foregoing and/or other aspects of the present invention will become clearer.

DETAILED DESCRIPTION OF THE EMBODIMENTS

Embodiment 1

The RFID technology consists of three parts: an antenna, a reader and an RFID tag. The antenna transmits a radio frequency signal to inquire the RFID tag, the radio frequency signal will be reflected by the tag after arriving at the RFID tag, the reader identifies the RFID tag through a received reflected signal, and an RSSI signal is one of the reflected signals. In the present embodiment, the placement posture of the book in a library is identified by using the RSSI signal value reflected by the tag. The relationship between the distance and the RSSI signal value is as follows:

$$d = 10^{\wedge}((abs(RSSI) - A)/(10 \times n))$$

d represents the obtained distance, RSSI is received signal intensity (a negative value), A represents the signal intensity when a transmitting end is one meter away from a receiving end, and n represents an environmental attenuation factor. The following formula can be converted from the above formula:

$$RSSI = -\log(10 \times n \times d + A)$$

The above formula indicates that the smaller the distance d is, the larger the RSSI value is, in the present embodiment, it means that the closer the distance between the antenna and the RFID tag of the book is, and the larger the obtained RSSI value is.

Figure 1:
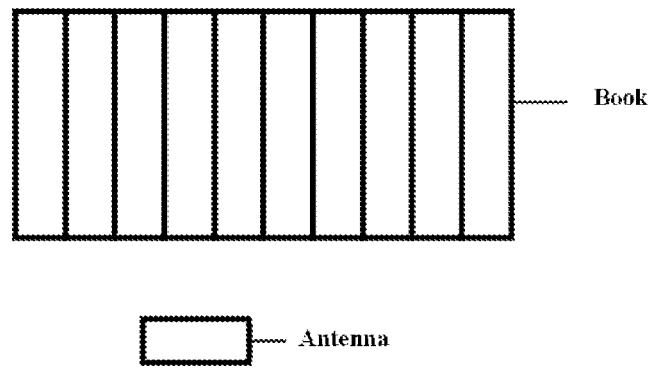
FIG. 1 is a top view of a position relationship between an antenna and a bookshelf.

During the process of identifying the placement posture of the book on the bookshelf of the library, the antenna should be placed in parallel not far away from the book, or otherwise, the sizes of the RSSI values of the book at different moments have no large difference, thereby affecting the establishment of the model. In the present embodiment, the distance from the antenna to the book is set as 10 cm. In a book scanning process, the antenna is slowly moved from one side of the bookshelf to the other side of the bookshelf at a constant speed, and the top view is as shown in FIG. 1.

Figure 2:
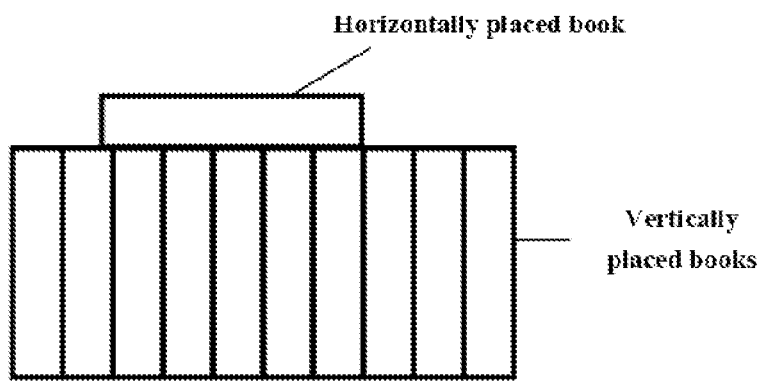
FIG. 2 is a front view of a book placed horizontally on a bookshelf and a book placed vertical to the bookshelf.

In the library, the books are sometimes mistakenly placed by other readers on other vertically placed books correctly, leading to book disarray in the library, and FIG. 2 shows the phenomenon of this placement state.

Figure 3:
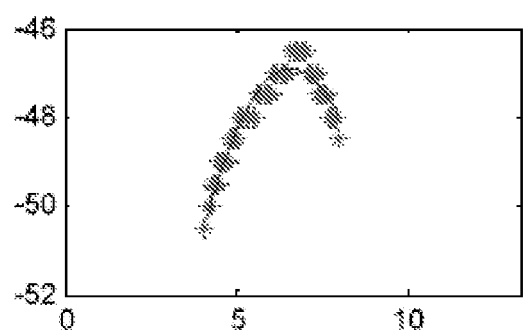
FIG. 3 is a time-varying view of an RSSI value.

Through theoretical analysis and experiments, the time-varying rules of the RSSI signal value is as shown in FIG. 3.

The following conclusions can be drawn from FIG. 3:

When the antenna is close to the RFID tag, the read RSSI values of the RFID tag show a progressive increase increasing trend; when the antenna is far away from the RFID tag, the RSSI values show a progressive decrease trend, and the RSSI value read at the RFID tag is the maximum.

The present embodiment provides a book placement posture identification method based on an RSSI signal value of the RFID technology, wherein the data collection process is as follows:

1. An RFID tag is embedded in each book in advance, an epc number containing a book id number is written in the tag, the epc number of the RFID tag is read to extract a corresponding id number of the book, and the book information corresponding to the corresponding id number is inquired from a background database server.

2. The antenna is placed at a distance of about 10 cm from the bookshelf and is slowly moved from one end of the bookshelf to the other end of the bookshelf horizontally at a constant speed in a manner of being parallel to the bookshelf so as to collect the data of the tag.

3. The information collected every time includes three data: the EPC number epc of the RFID tag, an RSSI signal rssi value reflected by the RFID tag, and a time t of reading the tag signal, the three data are marked as a triple p={epc, rssi, t} and is stored in a background database file.

Before the placement posture of the book is detected, a classification model is firstly determined so as to analyze and judge the placement posture of the book in the subsequent steps according to the classification model, and the specific process is as follows:

1. A part of books is randomly selected, these books are horizontally placed on other books that are vertically placed on the bookshelf normally, and the information of these horizontally placed books is recorded.

2. The information of the books is collected according to the above data collection process, including information of the horizontally placed books and the information of the vertically placed books.

3. Data processing is performed on the collected information, quadratic curve models are separately established, and the quadratic curve models are classified by using the Naive Bayes algorithm, the SVM algorithm and the like to construct a classification model.

After the data collection is completed, the data must be preprocessed and the model is established. The specific process is as follows:

1. The collected triples are classified according to the epc numbers, the triples with the same epc number are classified as a category P to express the RSSI signal values of the book read at different moments.

2. The triples in each category P are sorted according to time, the triples p with small triple time are in the front, and the triples p with large time are behind.

3. As environmental factors generate influence to the RSSI value reflected by the tag, resulting in non-ideal data, so smoothing processing needs to be performed on the data, and the value of the RSSI value in each triple is an average value of the RSSI values of two adjacent triples so as to reduce the data jitter phenomenon.

4. The maximum RSSI value and the corresponding time tin each category P are obtained and are marked as maxindex, and the time indicates the moment when the antenna is closest to the RFID tag.

5. Due to the influence of environmental factors, in the rssi value curve corresponding to each book, the points of the RSSI values appearing at some time deviate from the curve further, therefore some discrete points or small waves occur, and these sparse points need to be processed at first. For each category P, front and back triples are traversed from the maxindex, and if a time difference $\Delta t$ of two adjacent triples p is greater than a threshold, the data of the triples beyond the triples are eliminated so as to remove discrete data. The threshold is set according to the size of the time, and in the present embodiment, the unit of the time is second, and thus the threshold is set as 0.1 second.

6. Only the wave where the highest point is located needs to be obtained, and other smaller waves should be eliminated. For each category P, front and back triples are traversed from the maxindex: in a forward traversing process, the rssi values in the triples should be smaller and smaller, and if the triple with the rssi value starting to become large is traversed, the data of the triples in front of the triple are eliminated; and in a backward traversing process, the rssi values in the triples should also be smaller and smaller, and if the triple with the rssi value starting to become large is traversed, the data of the triples behind the triple are eliminated.

7. After the data are pre-processed, the quadratic curve model of the data is established to obtain a time-varying curve model of the RSSI value, the model should be a quadratic curve with a downward opening, and the larger the opening is, it indicates that the longer the time of the read corresponding RFID tag is, the more the reading times is, which means that the greater the probability that the RFID tag is in a horizontal state is. If the difference of the absolute value of the quadratic coefficient a of the quadratic curve and the threshold obtained in the above training process is within a range, in the present embodiment, the range is set within 0.005, and the specific range is set according to specific environment.

According to the quadratic curve model and the classification model, the placement posture of the book is judged, the placement posture of the book needs to be confirmed by using a book sorting algorithm at last, and the specific process is as follows:

1. The antenna is placed at a distance of about 10 cm from the bookshelf and is slowly moved at a position where a book is placed horizontally from the bottom end of the bookshelf to the upper end of the bookshelf horizontally at a constant speed in a manner being parallel to the bookshelf so as to collect the data of the tag.

2. The processes of data classification, preprocessing and establishing the quadratic curve model are the same as the data processing process during book placement posture identification.

3. According to the established quadratic curve model, the time where the highest point is located is extracted, the time corresponding to all the RFID tags are sorted from small to large, if the RFID tags have time sequence difference, and the time where the book being judged to be placed horizontally is located is the maximum, it is judged that the book is actually placed horizontally on other books and is not judged incorrectly.

Figure 4:
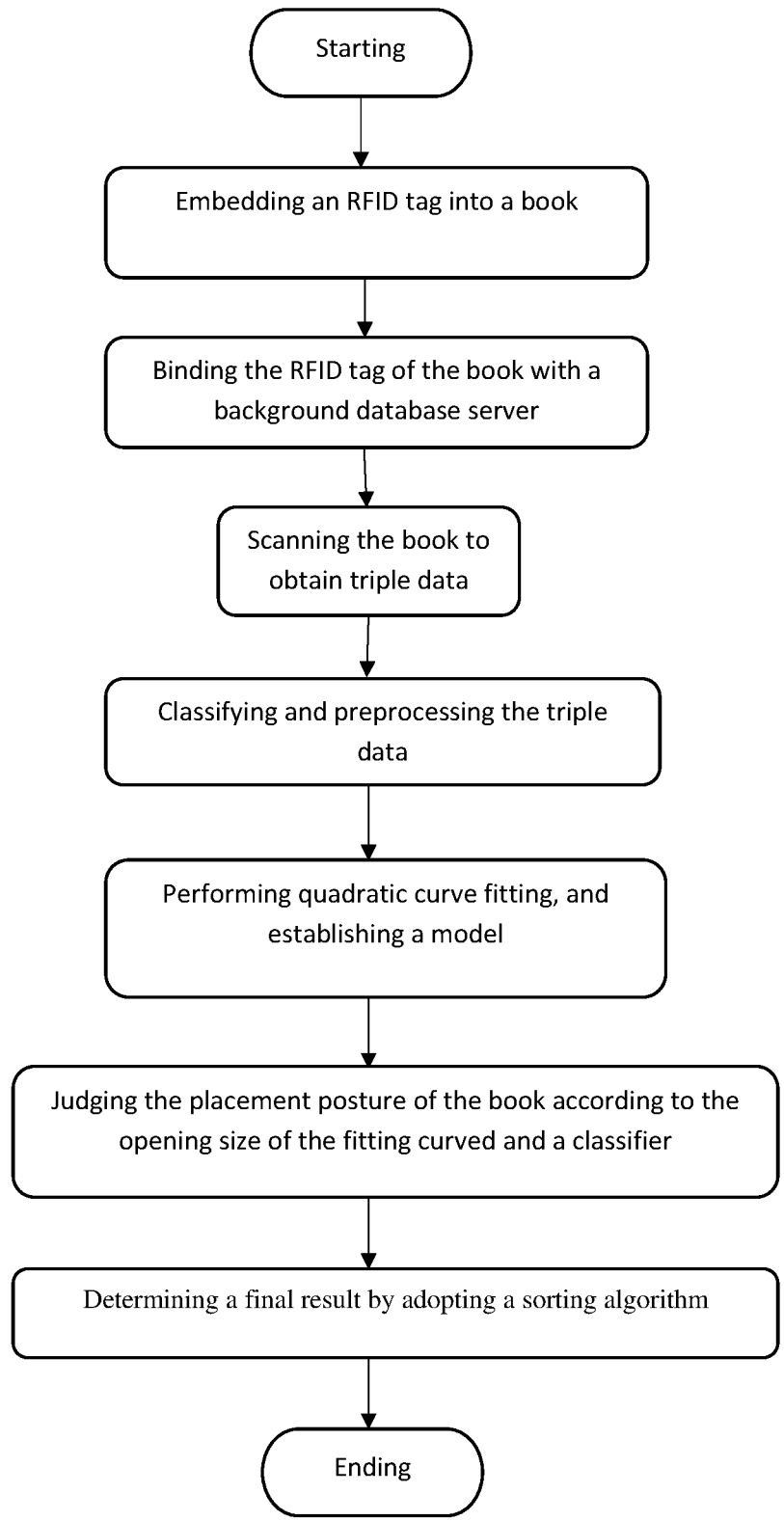
FIG. 4 is a flowchart of an embodiment.

The flowchart of the book placement posture identification method based on the RSSI signal value of RFID of the present embodiment is as shown in FIG. 4.

1. Embedding the RFID Tag in the Book, Binding the EPC Number of the Tag with the Id Number of the Book, and Binding the Book Information with the Background Database Server The format of the epc number of the RFID tag in the book is set as follows:

0BCXXXXXXXXX000000000

0 represents that the type of the book is a book RFID tag

B represents a lending state of the book 0 represents un-lent 1 represents lent 2 represents not allowed to be lent C represents length, and the existing encoding length of the book is 8

XXXXX represents the ID number of the book and is obtained by a bar code of the book 00000: a zero filling operation needs to be performed in the absence of double bytes due to the requirements of RFID encoding;

After the epc number of the tag is obtained, 8 digits starting from the fourth number of the epc number are extracted to serve as the id number of the book, the background database contains the id information of the book and specific information of the book, such as title, author and so on. After the id number of the book is extracted from the read epc number of the tag, the book information can be inquired in the background database according to the id number.

2. Scanning the Book by Using the Antenna to Obtain the Data of the Tag in the Book The books on the bookshelves in the library should be neatly arranged, or otherwise the identification effect is affected. After all the books are neatly arranged, the antenna is placed at a position away from the books about 10 cm in parallel. The antenna cannot be too far away from the books, or otherwise the RSSI values returned by a book will not be significantly different in a movement process, because there is no major change in the distance of the antenna from the book within a certain range. The moving speed should not be too high, if the moving speed is too high, and the times of reading the tags by the antenna is reduced, and the speed is controlled at about 0.1 m/s in the present embodiment.

Data collection should be divided into twice, one is to collect training data to obtain the classification model and the threshold so as to prepare for the subsequent classification process, and the other is to collect the data of the book with the placement posture to be identified, and thus the corresponding data processing and model establishment processes are performed twice.

3. Classifying and Preprocessing the Collected Data to Eliminate Impurity Data and Establish a Foundation for Constructing an Ideal Model In the data collection process, multiple books often alternately reflect signals, therefore, the data recorded in the background database are usually a staggered array of the data of the multiple books, these staggered data need to be classified to extract the corresponding triple set of each book, and the used classification method is to classify the data with the same epc number into a category, and then sort the data in the triple sets divided according to time sizes. As the interference of the environmental factors on the RSSI signal of the RFID tag is larger, and the thicknesses of the books are different, the RSSI signal data collected from each book are not very ideal, and impurity data are contained and need to be removed after being preprocessed.

The ideal data arrangement should be similar to the shape of the quadratic curve, and thus the relatively discrete points and small peaks need to be eliminated.

4. Fitting a Curve of the Preprocessed Data, and Establishing the Quadratic Curve Model for the Preprocessed Data to Identify the Placement Posture of the Book The quadratic curve model is constructed according to the preprocessed data, the model should be a quadratic curve with a downward opening, the larger the opening is, it indicates that the longer the time of the read corresponding RFID tag is, the more the reading times is, which means that the greater the probability that the RFID tag is in a horizontal state is. The model is constructed twice, once is used for training the data to obtain the classification model and the classification threshold, and the other is used for identifying the placement posture of the book, if the difference of the quadratic coefficient of the curve obtained in the identification process and the threshold obtained by the classification model is within a small range, it can be judged that the book is in the horizontal state.

5. Finally Judging the Placement Posture of the Book by Using a Book Sorting Algorithm The judgment result of the above process may have a certain error due to the influence of the environmental factors, resulting in misjudgment, in order to finalize that the book is indeed horizontally placed on other vertically placed books, the final judgment needs to be made by secondary judgment. When the position of the horizontally placed book is judged, the books are further vertically scanned to collect data so as to sort the books. If there is only one vertically placed book, then the final sorting result is that there is only one time or several similar time values, and then it proves that the judgment is incorrect, and the book is correctly placed. If a book is horizontally placed on other books at the position, then the final sorting result should be that there is a time exceeding one book, and the time interval difference is not small, and it is judged that the reading time of the horizontally placed book is behind.

Figure 5:
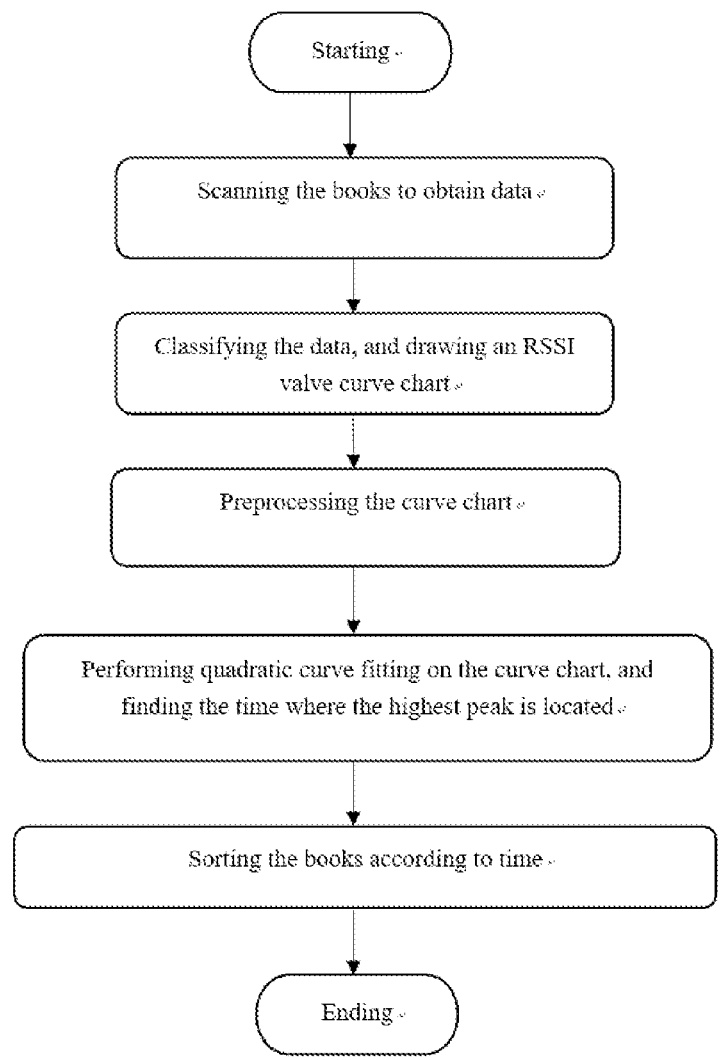
FIG. 5 is a flowchart of book sorting.

The flowchart of sorting books in a library based on RSSI values of the RFID tags in the present embodiment is as shown in FIG. 5.

1. Scanning Books to Obtain Data

Different from the data collection process of book placement posture identification, the book scanning direction in book sorting is vertical to the book scanning direction in the book posture identification, and the scanning is started from the bottom end of a layer of bookshelf to the upper end of the layer of bookshelf. The rest steps are the same as those in the book placement posture identification process.

2. Classifying the Data, and Drawing an RSSI Value Curve Chart

The obtained data are in such a way that the data of multiple books are interleaved together, the data need to be extracted and classified, the data with the same epc number are classified into a category to represent the RSSI values returned by the RSSI tag of one book at different time. The classified data are arranged according to time to obtain a time-varying RSSI value curve chart.

3. Preprocessing the Data

Due to the interference of the environmental factors and the different thicknesses of the books, the curve chart obtained in the above step has discrete points and small peaks, which are interference factors in the subsequent steps, these points need to be eliminated, and only a segment of continuous curve having the highest value is left.

4. Curve Fitting and Book Sorting

The preprocessed curve is not yet the best model for its analysis, quadratic curve fitting needs to be performed on the curve to obtain a complete wave band that increases progressively and then decreases progressively with time, and the time where the maximum value is located is set as T. The obtained $T_1, T_2, T_3 \ldots Tn$ are sorted in a descending order, and this sequence is the position sequence of the books where the tags are located.

The present invention provides a book placement posture identification method based on the RSSI signal value of the RFID, there are many ways and means for implementing the technical solutions, the foregoing descriptions are merely preferred implementation of the present invention, it should be noted that, for those of ordinary skill in the art, various improvements and modifications can be made without departing from the principle of the present invention, and these improvements and modifications shall also fall within the protection scope of the present invention. The components that are not clearly defined in the present embodiment can be implemented by the prior art.

What is claimed is:

1. A method for identifying a book placement posture by a RFID (Radio Frequency Identification) device, comprising the following steps:
   reading an FID tag placed in the book with the RFID device, wherein the RFID tag comprises: an EPC (Electronic Product Code) number, represented as "epc", of the RFID tag of the book, the RSSI (Received Signal Strength Indicator) value, represented as "rssi", of the RFID tag of the book, and a moment, represented as "t", when the RFID tag is read, a triple, represented as "p", p={epc, rssi, t} for expressing the EPC number and the RSSI value when they are read at the moment for the book;
   classifying the triple with the same EPC number as a category named as "P" to serve as the RSSI signal values of the internal RFID tag of the book obtained at different moments;
   preprocessing, by a processor, the triple obtained in above step:
      sorting the triple in each category P according to time, wherein the triple are arranged by the value of "t" from the smallest to the largest;
      performing smoothing processing on the data;
      obtaining the maximum RSSI value and the corresponding "t" in each category P, and named as "maxindex";
      for each category P, traversing the triple from the maxindex; eliminating the data of the triple that is beyond the triple if a time difference Δt of two adjacent triple p is greater than a threshold; and
      for each category P, traversing the triple from the maxindex: in a forward traversing process, if the triple with the rssi value starting to become largest is traversed, eliminating the data of the triple in front of the triple; and in a backward traversing process, if the triple with the rssi value starting to become largest is traversed, eliminating the data of the triple behind the triple;
   establishing, by the processor, a quadratic curve model of the data preprocessed in above step to obtain a time-varying rule of the RSSI value of the RFID tag of the book;
   performing, by the processor, -training by using the quadratic curve model established in above step to obtain a classification model; collecting the RFID tag of the to-be-identified book, and judging whether the placement posture of the to-be-identified book is being placed vertical to a bookshelf or placed horizontally on the bookshelf according to the classification model; and
   finally confirming the position of the book according to a sorting algorithm, and judging whether the judgment in above step is incorrect.

2. The method of claim 1, wherein it further comprises: classifying the triples according to the EPC numbers, and classifying the triple with the same EPC number as a category P to express the RSSI signal values of the book read at different moments.

3. The method of claim 1, wherein it further comprises:
   performing, by the processor, quadratic curve fitting on the data preprocessed, and establishing the quadratic curve model to obtain the time-varying rule of the RSSI value of the RFID tag of the book.

4. The method of claim 3, wherein it further comprises the following steps:
   randomly taking out a certain number of books, horizontally placing the books on other vertically placed books, reading the RFID tags of these books, preprocessing the RFID tags, and establishing the quadratic curve model;
   training the quadratic curve model established in above by using an SVM (Support Vector Machine) classification algorithm to obtain the classification model; and
   reading the RFID tag of a to-be-identified book, performing preprocessing, establishing the quadratic curve model of the to-be-identified book, placing the quadratic curve model of the to-be-identified book in the classification model, performing classification judgment, and identifying whether the placement posture of the book is being placed vertical to the bookshelf or placed horizontally on the bookshelf.

5. The method of claim 4, wherein it further comprises the following steps:
   when the book is placed horizontally on the bookshelf vertically moving to read the RFID tag placed in the book by using the RFID device; and
   finally confirming, by the processor, the position of the book by using an RSSI book sorting algorithm, and judging whether the result in previous step is incorrect.

6. The method of claim 5, wherein it further comprises the following steps:
   classifying, by the processor, the triple with the same EPC number as a category, and performing data preprocessing and quadratic curve fitting;
   obtaining, by the processor, the time T where the wave crest, namely, the highest point, of the fitted curve is located, and sorting the time T of all the RFID tags to obtain a position sequence of each book corresponding to the RFID tag; and
   if the time of the RFID tags are arranged in sequence, and it is judged that the time where the book placed horizontally on the bookshelf is located comes last, indicating that the judgment in previous step is correct, and otherwise, indicating that the judgment previous step is incorrect, and the book is placed vertical to the bookshelf.

* * * * *